(12) United States Patent
Wei

(10) Patent No.: US 10,817,450 B1
(45) Date of Patent: Oct. 27, 2020

(54) USB APPARATUS AND OPERATION METHOD THEREOF

(71) Applicant: VIA LABS, INC., New Taipei (TW)

(72) Inventor: Yu-Chung Wei, New Taipei (TW)

(73) Assignee: VIA LABS, INC., New Taipei (TW)

( * ) Notice: Subject to any disclaimer, the term of this patent is extended or adjusted under 35 U.S.C. 154(b) by 0 days.

(21) Appl. No.: 16/691,491

(22) Filed: Nov. 21, 2019

(30) Foreign Application Priority Data

Oct. 8, 2019 (TW) .............................. 108136367 A

(51) Int. Cl.
  *G06F 13/38* (2006.01)
  *G06F 13/40* (2006.01)
  *G06F 1/3206* (2019.01)
  *H02H 3/20* (2006.01)

(52) U.S. Cl.
  CPC .......... *G06F 13/382* (2013.01); *G06F 1/3206* (2013.01); *G06F 13/4022* (2013.01); *H02H 3/20* (2013.01); *G06F 2213/0042* (2013.01)

(58) Field of Classification Search
  CPC .. G06F 13/382; G06F 1/3206; G06F 13/4022; G06F 13/4027; G06F 13/4081
  See application file for complete search history.

(56) References Cited

U.S. PATENT DOCUMENTS

| | | | |
|---|---|---|---|
| 10,218,129 B1* | 2/2019 | Mondal | H03K 19/018557 |
| 10,630,028 B2* | 4/2020 | Vispute | G06F 13/4022 |
| 2016/0190794 A1* | 6/2016 | Forghani-Zadeh | H02H 9/048 361/86 |
| 2017/0220090 A1* | 8/2017 | Kim | G06F 1/3253 |
| 2020/0235563 A1* | 7/2020 | Zhu | H04L 12/40045 |

* cited by examiner

*Primary Examiner* — Raymond N Phan
(74) *Attorney, Agent, or Firm* — JCIPRNET

(57) ABSTRACT

A USB apparatus and an operation method thereof are provided. The USB apparatus includes a USB connector, a terminal resistor circuit, and an overvoltage protection circuit. The terminal resistor circuit includes a terminal resistor and a terminal switch connected to each other in series. The terminal resistor and the terminal switch jointly provide a current path between a configuration channel (CC) pin of the USB connector and a reference voltage. The terminal switch is turned on during a configuration detection period. During a power saving period after the configuration detection period ends, the overvoltage protection circuit controls the terminal resistor circuit to turn off the terminal switch. The overvoltage protection circuit detects an overvoltage event at the CC pin. When an overvoltage event occurs at the CC pin, the overvoltage protection circuit controls the terminal resistor circuit to turn on the terminal switch.

21 Claims, 13 Drawing Sheets

USB APPARATUS AND OPERATION METHOD THEREOF

CROSS-REFERENCE TO RELATED APPLICATION

This application claims the priority benefit of Taiwan application serial no. 108136367, filed on Oct. 8, 2019. The entirety of the above-mentioned patent application is hereby incorporated by reference herein and made a part of this specification.

BACKGROUND OF THE INVENTION

1. Field of the Invention

The invention relates to an electronic apparatus, and in particular, to a universal serial bus (hereinafter referred to as USB) apparatus and an operation method thereof.

2. Description of Related Art

Recently, USB connectors become a popular communication interface. Based on the need of apparatus miniaturization, sizes of USB connectors are required to be miniaturized. For example, the USB standards organization has proposed a new generation of USB type-C connector standards to meet the requirement of miniaturization. A USB type-C connector includes a configuration channel (hereinafter referred to as CC) pin, a power (hereinafter referred to as Vbus) pin, and other pins. The Vbus pin may transmit a high voltage (for example, 20 volts or other voltage levels). It should be noted that due to the mechanical structure of the USB type-C connector itself, the CC pin (CC1 pin or CC2 pin) of the USB type-C connector is adjacent to the Vbus pin. When a user uses the USB type-C connector, a short may occur between the CC pin and the Vbus pin. When the high voltage of the Vbus pin accidentally strikes the CC pin, this high voltage may burn a related circuit and/or element connected to the CC pin.

It should be noted that the information disclosed in this Background section is only for enhancement of understanding of the background of the invention and therefore it may contain some information (or all information) that does not form the prior art that is already known to a person of ordinary skill in the art. Further, the information disclosed in the Background section does not mean that one or more problems were acknowledged by a person of ordinary skill in the art.

SUMMARY OF THE INVENTION

The invention provides a universal serial bus (hereinafter referred to as USB) apparatus and an operation method thereof. When an overvoltage event occurs at a configuration channel (hereinafter referred to as CC) pin of a USB connector, the USB apparatus may instantly step down a voltage across a terminal switch in a terminal resistor circuit to protect the terminal switch.

An embodiment of the invention provides a USB apparatus. The USB apparatus includes a USB connector, a first terminal resistor circuit, and a first overvoltage protection circuit. The first terminal resistor circuit includes a first terminal resistor and a first terminal switch connected to each other in series, where the first terminal resistor and the first terminal switch jointly provide a current path. One terminal of the current path is coupled to a first CC pin of the USB connector, and another terminal of the current path is coupled to a first reference voltage. The first terminal switch is turned on during a configuration detection period. The first overvoltage protection circuit is coupled to a first CC pin of the USB connector, to detect an overvoltage event. The first overvoltage protection circuit is coupled to the first terminal resistor circuit to affect the first terminal switch. During a power saving period after the configuration detection period ends, the first overvoltage protection circuit controls the first terminal resistor circuit to turn off the first terminal switch. When the overvoltage event occurs at the first CC pin, the first overvoltage protection circuit controls the first terminal resistor circuit to turn on the first terminal switch.

An embodiment of the invention provides an operation method of a USB apparatus. The operation method includes the following steps. A first terminal resistor and a first terminal switch connected to each other in series jointly provide a current path in a first terminal resistor circuit, where one terminal of the current path is coupled to a first CC pin of a USB connector, and another terminal of the current path is coupled to a first reference voltage. The first terminal switch is turned on during a configuration detection period. A first overvoltage protection circuit detects an overvoltage event at the first CC pin. During a power saving period after the configuration detection period ends, the first overvoltage protection circuit controls the first terminal resistor circuit to turn off the first terminal switch. When the overvoltage event occurs at the first CC pin the first overvoltage protection circuit controls the first terminal resistor circuit to turn on the first terminal switch.

Based on the above, according to the USB apparatus and the operation method thereof in the embodiments of the invention, it may be detected whether the overvoltage event occurs at the CC pin of the USB connector. When the overvoltage event occurs at the CC pin, the overvoltage protection circuit may control the terminal resistor circuit to turn on the terminal switch in the terminal resistor circuit to instantly step down a voltage across the terminal switch. Therefore, according to the USB apparatus and the operation method thereof, the terminal switch may be protected.

To make the features and advantages of the invention clear and easy to understand, the following gives a detailed description of embodiments with reference to accompanying drawings.

DESCRIPTION OF THE EMBODIMENTS

Figure 1:
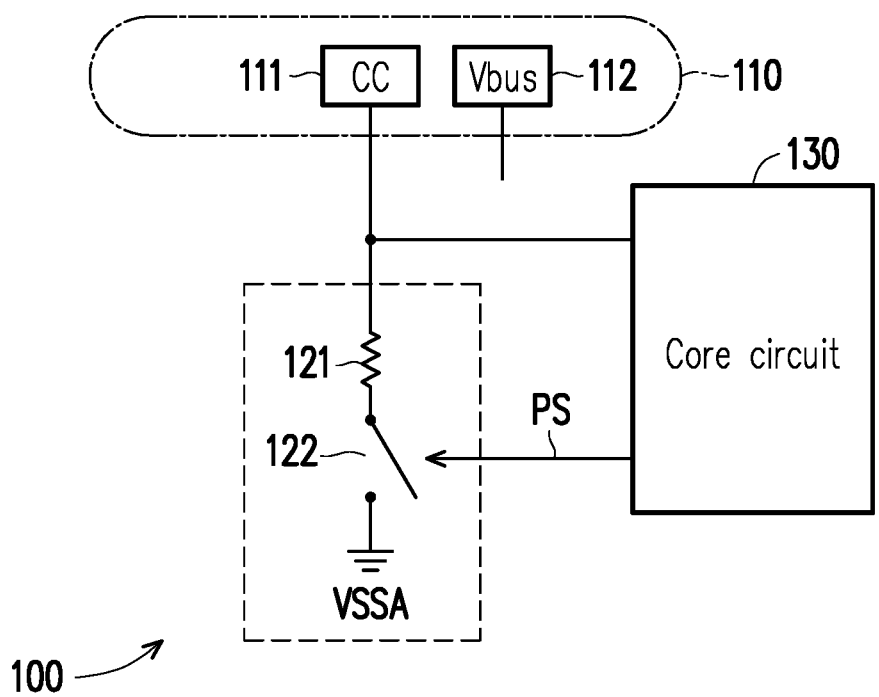
FIG. 1 is a schematic circuit block diagram of a USB apparatus having a USB type-C connector according to an embodiment.

The term "coupled (or connected)" used in the entire specification (including the claims) may mean any direct or indirect connection means. For example, a first device coupled (connected) to a second device described herein should be interpreted as that the first device may be directly connected to the second device, or that the first device may be indirectly connected to the second device by other devices or by some means of connection. Terms such as "first" and "second" used in the entire specification (including the claims) are used to name components (elements) or to distinguish between different embodiments or ranges, and are not intended to define the upper or lower limit of the number of components or the order of components. Wherever possible, the same reference numbers are used in the drawings and the description to refer to the same or like parts, components or steps. For parts, components or steps denoted by same reference numbers or names, reference can be made to the related descriptions.

A universal serial bus (hereinafter referred to as USB) standards organization proposes a USB type-C connector standard. FIG. 1 is a schematic circuit block diagram of a USB apparatus 100 having a USB type-C connector 110 according to an embodiment. The USB type-C connector 110 includes a configuration channel (hereinafter referred to as CC) pin 111 and a power (hereinafter referred to as Vbus) pin 112. The CC pin 111 may indicate a CC1 pin or a CC2 pin of the USB type-C connector 110. For simplicity of the drawing, the embodiment shown in FIG. 1 does not show other pins of the USB type-C connector 110. In any case, the USB type-C connector 110 is a connector that conforms to the USB standard specification.

The USB apparatus 100 shown in FIG. 1 further includes a terminal resistor 121 and a core circuit 130. The terminal resistor 121 is sometimes also referred to as an electrical termination. One terminal of the terminal resistor 121 is coupled to the CC pin 111 of the USB type-C connector 110, and another terminal of the terminal resistor 121 is coupled to a reference voltage VSSA through a terminal switch 122. The reference voltage VSSA may be any fixed voltage (for example, a ground voltage) that is determined in accordance with design requirements. The terminal resistor 121 shown in FIG. 1 may be a Ra resistor or an Rd resistor conforming to the USB standard specification, and therefore the descriptions thereof are omitted herein.

The core circuit 130 is coupled to the CC pin 111 of the USB type-C connector 110. The core circuit 130 may include a power delivery (hereinafter referred to as PD) controller conforming to the USB standard specification and/or other USB control circuits. When an external apparatus (not shown) is electrically connected to the USB type-C connector 110, the core circuit 130 enters a configuration detection period to set a USB configuration of the USB apparatus 100. During the configuration detection period, the terminal switch 122 is turned on, and therefore the core circuit 130 may determine, according to a voltage level of the CC pin 111, whether a role of the external apparatus is a "host", or the external apparatus may determine, according to a voltage level of the CC pin, whether the USB apparatus 100 is a "device". After USB connection between the external apparatus (not shown) and the USB apparatus 100 is confirmed, that is, after the configuration detection period ends, an apparatus (for example, the external apparatus not shown) serving as a power provider may supply, via the Vbus pin 112, power to an apparatus (for example, the USB apparatus 100) serving as a power consumer. In addition, the core circuit 130 may communicate with the host (the external apparatus not shown) via the CC pin 111. After the communication is completed, the core circuit 130 may set a PD configuration of the USB apparatus 100 and/or other USB control configurations according to the communication result.

After the configuration detection period ends, the core circuit 130 may enter a power saving period. During the power saving period, the core circuit 130 may output a control signal PS to turn off the terminal switch 122. The turn-off of the terminal switch 122 may effectively reduce the current flowing through the terminal resistor 121. It should be noted that the current supplied to the CC pin 111 by the external apparatus (not shown) during the configuration detection period is extremely small (for example, 80 microamperes), and therefore element selection of the terminal switch 122 is limited. In general, a low voltage element is selected as the terminal switch 122. The low voltage element may be a low voltage tolerance device (whose gate source voltage Vgs and source/drain voltage Vds can only withstand low voltages) or a low threshold voltage (hereinafter referred to as Vt) component, a zero Vt element, or other low voltage elements. For example, the terminal switch 122 may include a native N channel metal oxide semiconductor (hereinafter referred to as NMOS) transistor. In any event, when the voltage across the low voltage element is too large, a high voltage will break down the low voltage element.

It should be noted that the CC pin 111 is disposed beside a Vbus pin 112. The Vbus pin 112 may transmit a high voltage (for example, 20 volts or other voltage levels). It should be noted that due to a mechanical structure of the USB type-C connector 110, the CC pin 111 (the CC1 pin or the CC2 pin) of the USB type-C connector 110 is immediately adjacent to the Vbus pin 112. During the use of the USB type-C connector 110 by a user, the CC pin 111 may be short-circuited with the Vbus pin 112. When the high voltage of the Vbus pin 112 accidentally strikes the CC pin 111, the high voltage may break down (damage) the terminal switch 122 during the power saving period (during a period in which the terminal switch 122 is turned off). How to protect the terminal switch 122 instantly when an overvoltage event occurs at the CC pin 111 is an important issue.

Figure 2:
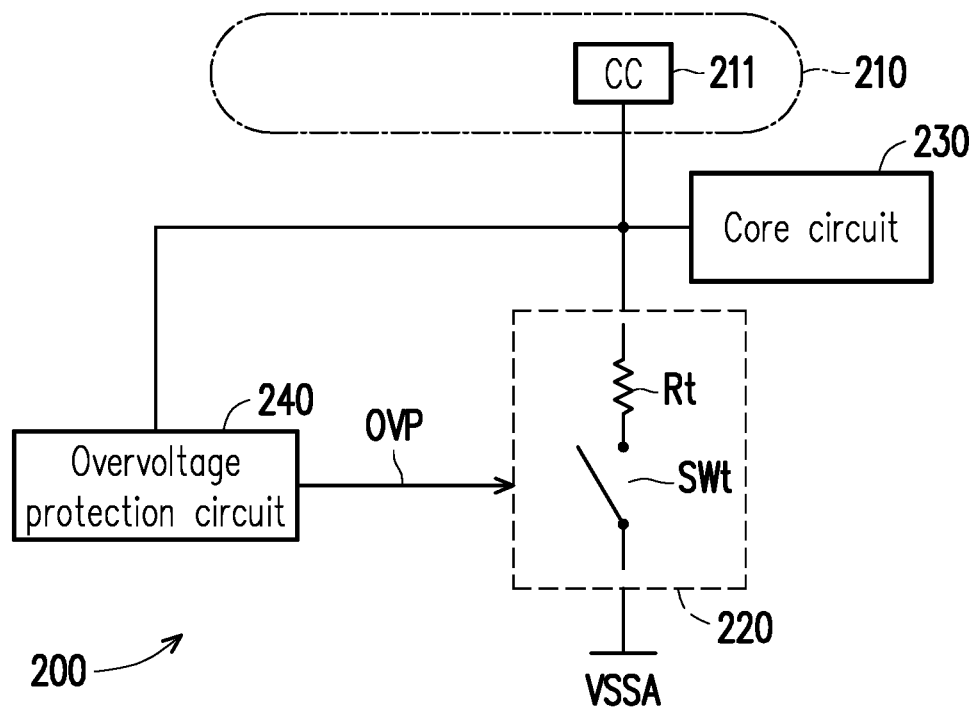
FIG. 2 is a schematic circuit block diagram of a USB apparatus according to an embodiment of the invention.

FIG. 2 is a schematic circuit block diagram of a USB apparatus 200 according to an embodiment of the invention. The USB apparatus 200 includes a USB connector 210, a terminal resistor circuit 220, a core circuit 230, and an overvoltage protection circuit 240. The USB connector 210 includes a configuration channel (hereinafter referred to as CC) pin 211. According to design requirements, the USB connector 210 may be a USB type-C connector or other types of USB connectors. The USB type-C connector is used as an example. The CC pin 211 may indicate a CC1 pin or a CC2 pin of the USB type-C connector. For simplicity of the drawing, the embodiment shown in FIG. 2 does not show other pins of the USB connector 210. In any case, the USB connector 210 is a connector that conforms to the USB standard specification. The USB connector 210, the CC pin 211, and the core circuit 230 shown in FIG. 2 may be analogized with reference to related descriptions of the USB connector 110, the CC pin 111, and the core circuit 130 that are shown in FIG. 1, and therefore the descriptions thereof are omitted.

The terminal resistor circuit 220 shown in FIG. 2 may be a Ra resistor or an Rd resistor conforming to the USB standard specification, and the descriptions of the Ra resistor or the Rd resistor are omitted herein. In the embodiment shown in FIG. 2, the terminal resistor circuit 220 includes a terminal resistor Rt and a terminal switch SWt connected to each other in series. The terminal resistor Rt and the terminal switch SWt jointly provide a current path between the CC pin 211 and a reference voltage VSSA. That is, one terminal of the current path is coupled to the CC pin 211 of the USB connector 210, and another terminal of the current path is coupled to the reference voltage VSSA. For example, in some embodiments, a first terminal of the terminal resistor Rt is coupled to the CC pin 211 of the USB connector 210, a second terminal of the terminal resistor Rt is coupled to a first terminal of the terminal switch SWt, and a second terminal of the terminal switch SWt is coupled to the reference voltage VSSA. In some other embodiments, a first terminal of the terminal resistor Rt is coupled to the reference voltage VSSA, a second terminal of the terminal resistor Rt is coupled to a first terminal of the terminal switch SWt, and a second terminal of the terminal switch SWt is coupled to the CC pin 211 of the USB connector 210. The terminal resistor Rt and the terminal switch SWt shown in FIG. 2 may be analogized with reference to related descriptions of the terminal resistor 121 and the terminal switch 122 that are shown in FIG. 1, and therefore the descriptions thereof are omitted.

Figure 3:
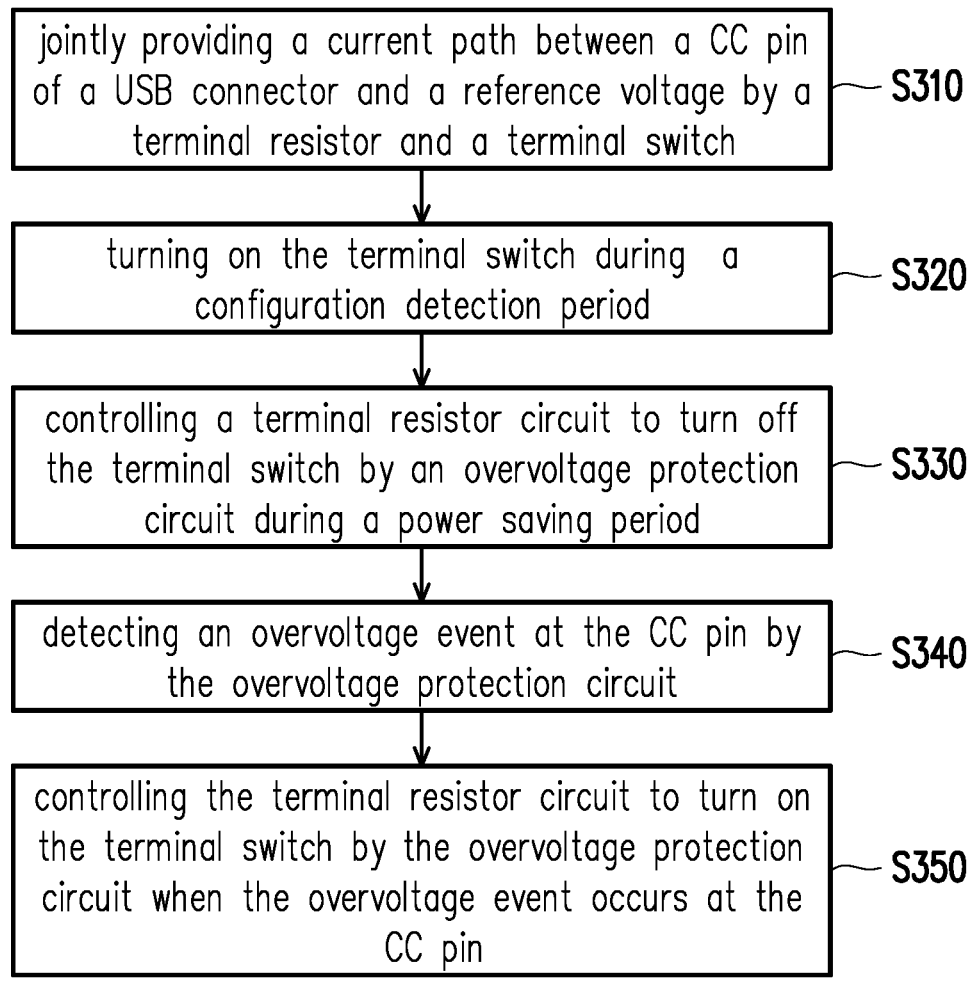
FIG. 3 is a schematic flowchart of an operation method of a USB apparatus according to an embodiment of the invention.

FIG. 3 is a schematic flowchart of an operation method of a USB apparatus 200 according to an embodiment of the invention. With reference to FIG. 2 and FIG. 3, in step S310, a terminal resistor Rt and a terminal switch SWt jointly provide a current path between a CC pin 211 and a reference voltage VSSA. When an external apparatus (not shown) is electrically connected to a USB connector 210, the USB apparatus 200 enters a configuration detection period to set a USB configuration of the USB apparatus 200. During a configuration detection period, the terminal switch SWt is turned on (step S320), and therefore a core circuit 230 may determine, according to a voltage level of the CC pin 211, whether a role of the external apparatus (not shown) is a "host", or the external apparatus may determine, according to a voltage level of the CC pin, whether the USB apparatus 200 is a "device". After USB connection between the external apparatus (not shown) and the USB apparatus 200 is confirmed, that is, after the configuration detection period ends, an apparatus (for example, the external apparatus not shown) serving as a power provider may supply, via the USB connector 210, power to an apparatus (for example, the USB apparatus 200) serving as a power consumer. In addition, the core circuit 230 may communicate with the host (the external apparatus not shown) via the CC pin 211. After the communication is completed, the core circuit 230 may set a PD configuration of the USB apparatus 200 and/or other USB control configurations according to the communication result.

An overvoltage protection circuit 240 is coupled to a terminal resistor circuit 220, to output a control signal OVP and affect the terminal switch SWt. For example, after the configuration detection period ends, the USB apparatus 200 may enter a power saving period. During the power saving period, the overvoltage protection circuit 240 may control the terminal resistor circuit 220 to turn off the terminal switch SWt (step S330). The turn-off of the terminal switch SWt may effectively reduce the current flowing through the terminal resistor Rt.

The overvoltage protection circuit 240 is further coupled to the CC pin 211 of the USB connector 210, to detect an overvoltage event at the CC pin 211 (step S340). When the overvoltage event occurs at the CC pin 211, the overvoltage protection circuit 240 may control the terminal resistor circuit 220 to turn on the terminal switch SWt (step S350). When the overvoltage event occurs at the CC pin 211, instant turn-on of the terminal switch SWt may instantaneously reduce a voltage across both ends of the terminal switch SWt. Therefore, the terminal switch SWt may be prevented from being broken down (damaged).

Figure 4:
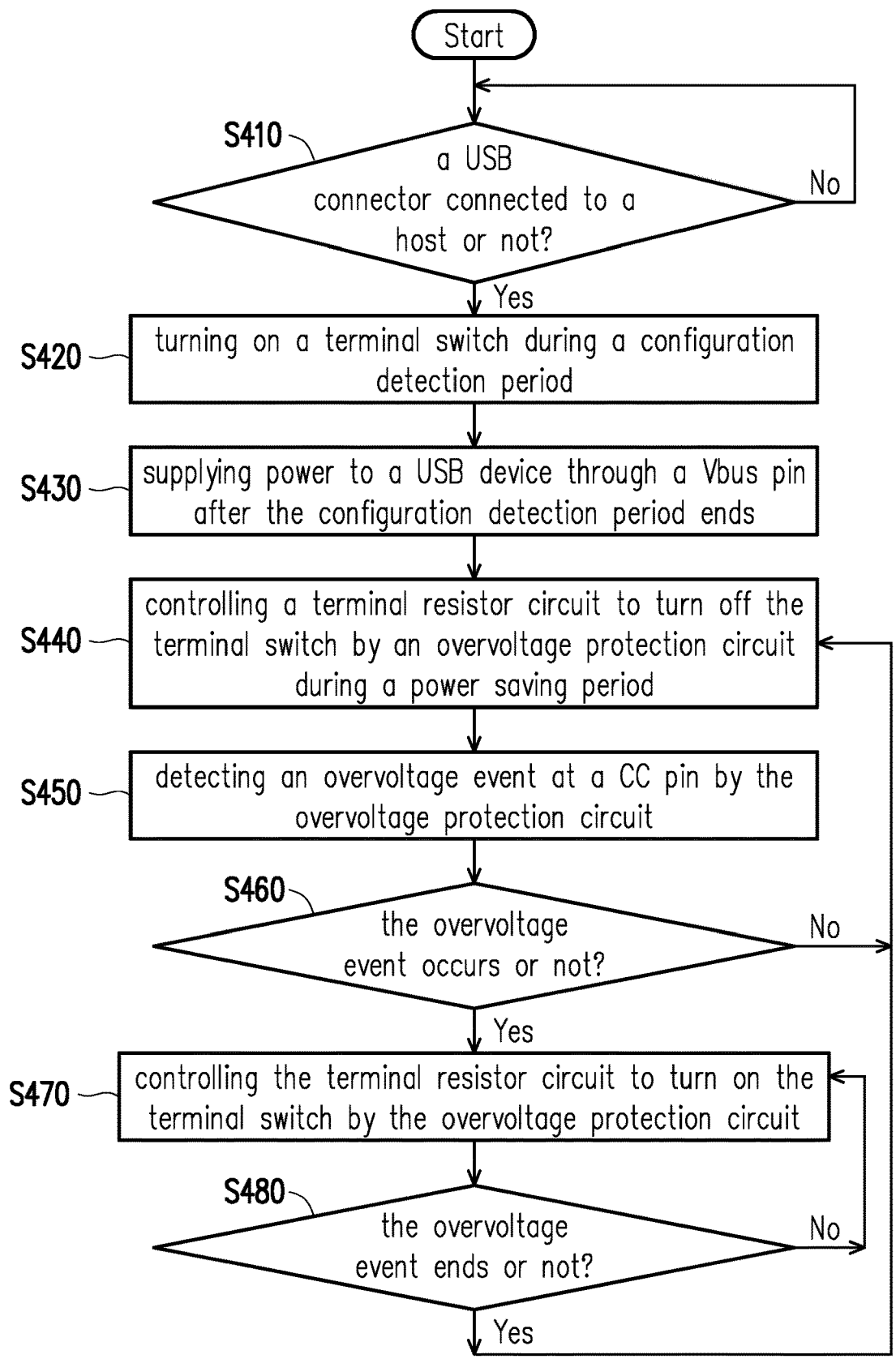
FIG. 4 is a schematic flowchart of an operation method of a USB apparatus according to another embodiment of the invention.

FIG. 4 is a schematic flowchart of an operation method of a USB apparatus 200 according to another embodiment of the invention. With reference to FIG. 2 and FIG. 4, the USB apparatus 200 may proceed to step S410 to determine whether a USB connector 210 is connected to an external apparatus (not shown). When the external apparatus (not shown) is connected to the USB connector 210, the USB apparatus 200 enters a configuration detection period to set a USB configuration of the USB apparatus 200. During a configuration detection period, the terminal switch SWt is turned on (step S420), and therefore a core circuit 230 may determine, according to a voltage level of a CC pin 211, whether a role of the external apparatus (not shown) is a "host", or the external apparatus may determine, according to a voltage level of the CC pin, whether the USB apparatus 200 is a "device".

After USB connection between the external apparatus (not shown) and the USB apparatus 200 is confirmed, that is, after the configuration detection period ends, the external apparatus (not shown) may supply, via a Vbus pin of the USB connector 210, power to the USB apparatus 200 (step S430). After the configuration detection period ends, the USB apparatus 200 may enter a power saving period. During the power saving period, an overvoltage protection circuit 240 may control the terminal resistor circuit 220 to turn off the terminal switch SWt (step S440).

In step S450, the overvoltage protection circuit 240 may detect an overvoltage event at the CC pin 211. When the overvoltage event of the CC pin 211 does not occur ("None" in step S460), the USB apparatus 200 may return to step S440 to keep the terminal switch SWt turned off. When the overvoltage event occurs at the CC pin 211 ("Yes" in step S460), the overvoltage protection circuit 240 may control the terminal resistor circuit 220 to turn on the terminal switch SWt (step S470). When the overvoltage event at the CC pin 211 does not end ("None" in step S480), the USB apparatus 200 may return to step S470 to keep the terminal switch SWt turned on. After the overvoltage event at the CC pin 211 ends ("Yes" in step S480), the USB apparatus 200 may return to step S470 to keep the terminal switch SWt turned off again.

Figure 5:
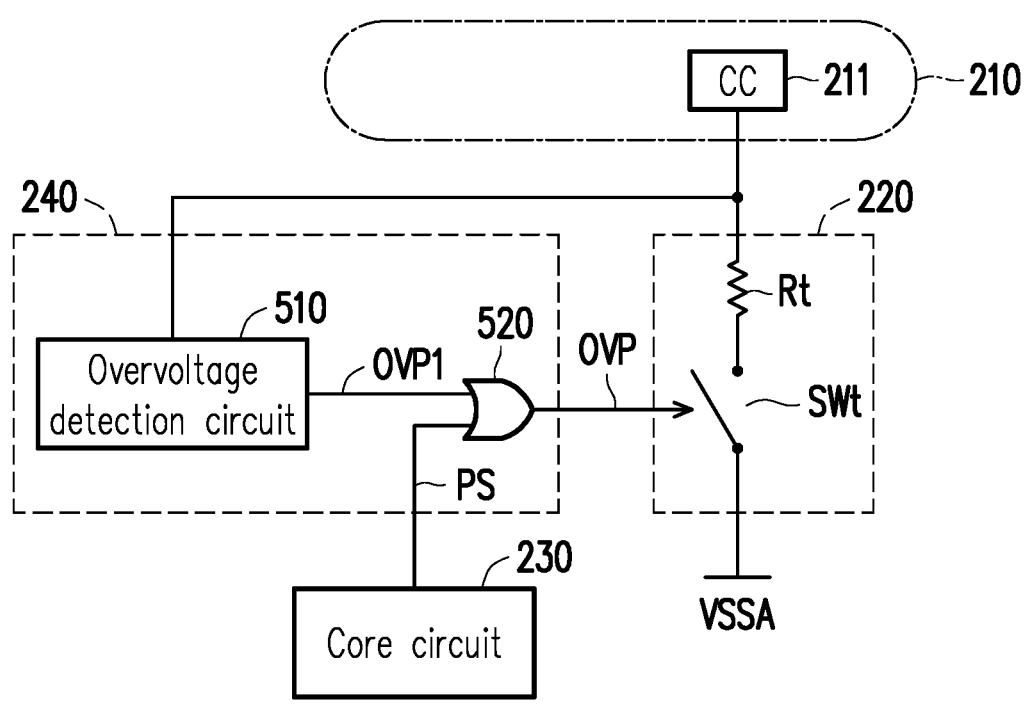
FIG. 5 is a schematic circuit block diagram of a terminal resistor circuit and an overvoltage protection circuit shown in FIG. 2 according to an embodiment of the invention.

FIG. 5 is a schematic circuit block diagram of a terminal resistor circuit 220 and an overvoltage protection circuit 240 shown in FIG. 2 according to an embodiment of the invention. In an embodiment shown in FIG. 5, a first terminal of a terminal resistor Rt is coupled to a CC pin 211 of a USB connector 210, a second terminal of the terminal resistor Rt is coupled to a first terminal of a terminal switch SWt, and a second terminal of the terminal switch SWt is coupled to a reference voltage VSSA. A control terminal of the terminal switch SWt is coupled to an output terminal of the overvoltage protection circuit 240, to receive a control signal OVP.

In an embodiment shown in FIG. 5, the overvoltage protection circuit 240 includes an overvoltage detection circuit 510 and an OR gate 520. The overvoltage detection circuit 510 is coupled to the CC pin 211 of the USB connector 210 to detect an overvoltage event. The overvoltage detection circuit 510 may correspondingly output a notification signal OVP1 to the OR gate 520 depending on occurrence of the overvoltage event. Therefore, the notification signal OVP1 may indicate the occurrence of the overvoltage event. A first input terminal of the OR gate 520 is coupled to an output terminal of the overvoltage detection circuit 510 to receive the notification signal OVP1. For example, when a voltage of the CC pin 211 of the USB connector 210 exceeds a certain threshold voltage, the overvoltage detection circuit 510 may correspondingly output, to the OR gate 520, a notification signal OVP1 whose logic state is "1". When a voltage of the CC pin 211 of the USB connector 210 does not exceed the threshold voltage, the overvoltage detection circuit 510 may correspondingly output, to the OR gate 520, a notification signal OVP1 whose logic state is "0". The threshold voltage may be determined according to design requirements. For example, in some embodiments, the threshold voltage may be 6 volts or other voltage values.

A second input terminal of the OR gate 520 receives a power saving signal PS provided by a core circuit 230. The power saving signal PS may define a power saving period. For example, when the core circuit 230 enters the power saving period, the core circuit 230 may correspondingly output, to the OR gate 520, the power saving signal PS whose logic state is "0". When the core circuit 230 leaves the power saving period, the core circuit 230 may correspondingly output, to the OR gate 520, the power saving signal PS whose logic state is "1". The power saving signal PS shown in FIG. 5 may be analogized with reference to the related description of the power saving signal PS shown in FIG. 1, and therefore the descriptions thereof are omitted.

An output terminal of the OR gate 520 is coupled to a control terminal of the terminal switch SWt to provide a control signal OVP. For example, when a logic state of the control signal OVP is "0", the terminal switch SWt is turned off. When a logic state of the control signal OVP is "1", the terminal switch SWt is turned on.

Figure 6:
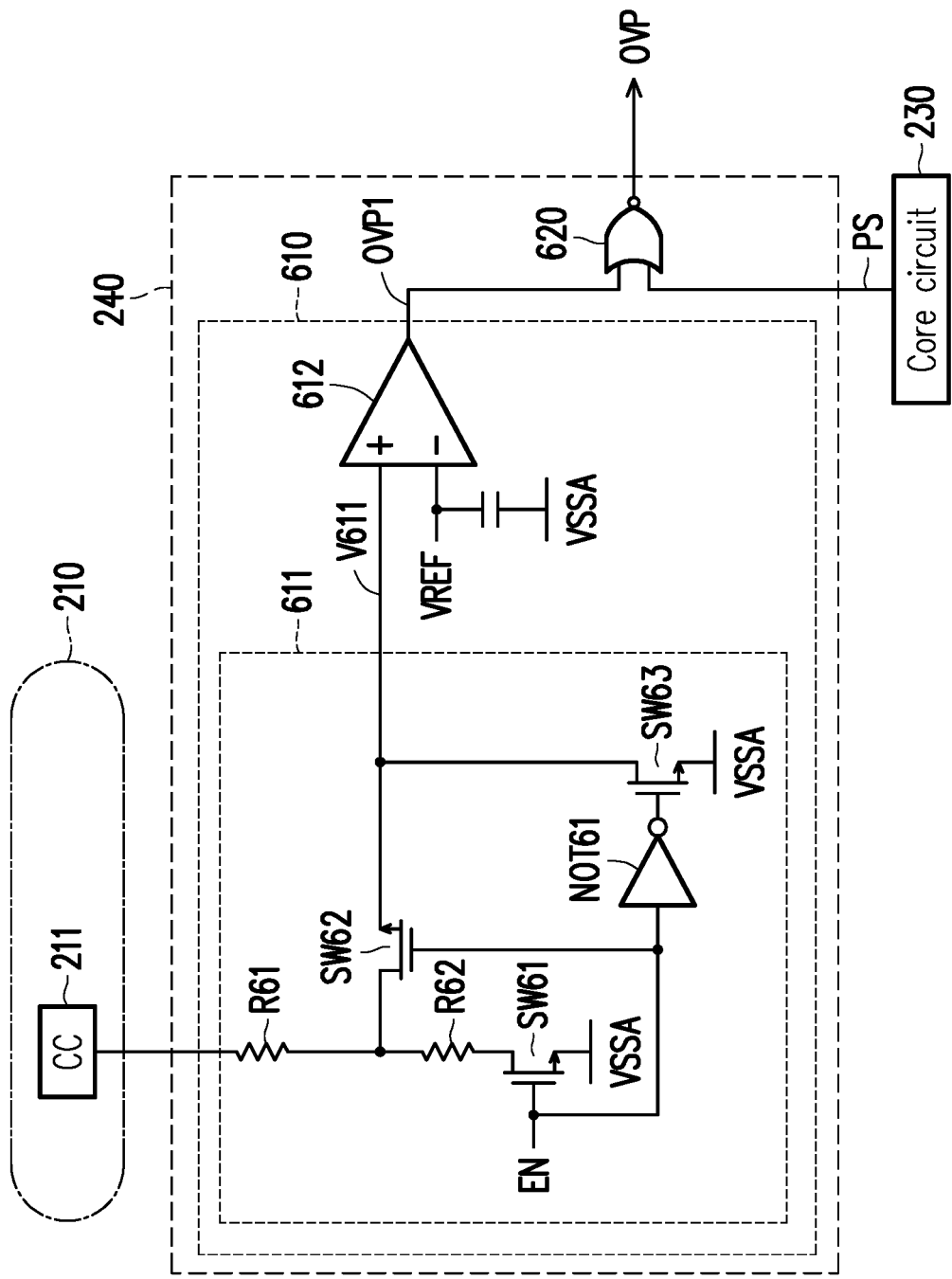
FIG. 6 is a schematic circuit block diagram of an overvoltage protection circuit shown in FIG. 2 according to another embodiment of the invention.

FIG. 6 is a schematic circuit block diagram of an overvoltage protection circuit 240 shown in FIG. 2 according to another embodiment of the invention. In an embodiment shown in FIG. 6, the overvoltage protection circuit 240 includes an overvoltage detection circuit 610 and a NOR gate 620. The overvoltage detection circuit 610 is coupled to a CC pin 211 of a USB connector 210 to detect an overvoltage event. The overvoltage detection circuit 610 may correspondingly output a notification signal OVP1 to the NOR gate 620 according to occurrence of the overvoltage event. A first input terminal of the NOR gate 620 is coupled to an output terminal of the overvoltage detection circuit 610 to receive the notification signal OVP1. A second input terminal of the NOR gate 620 receives a power saving signal PS provided by a core circuit 230. The power saving signal PS and the notification signal OVP1 shown in FIG. 6 may be analogized with reference to related descriptions of the power saving signal PS and the notification signal OVP1 that are shown in FIG. 5, and therefore the descriptions thereof are omitted. An output terminal of the NOR gate 620 is coupled to a terminal resistor circuit 220, to affect a terminal switch SWt.

In an embodiment shown in FIG. 6, the overvoltage detection circuit 610 includes a step-down circuit 611 and a voltage comparator 612. According to design requirements, implementation of the overvoltage detection circuit 510 shown in FIG. 5 may be analogized with reference to the related description of the overvoltage detection circuit 610 shown in FIG. 6. The step-down circuit 611 is coupled to the CC pin 211 of the USB connector 210, to receive a primary voltage at the CC pin 211. The step-down circuit 611 may step down the primary voltage of the CC pin 211 to output the stepped down voltage V611. A first input terminal (for example, a non-inverting input terminal) of the voltage comparator 612 is coupled to an output terminal of the step-down circuit 611 to receive the stepped down voltage V611. A second input terminal (for example, an inverting input terminal) of the voltage comparator 612 receives a reference voltage VREF. The reference voltage VREF may be any fixed voltage that is determined in accordance with design requirements. An output terminal of the voltage comparator 612 is coupled to a first input terminal of the NOR gate 620, to provide the notification signal OVP1.

In an embodiment shown in FIG. 6, the step-down circuit 611 includes a resistor R61, a resistor R62, a switch SW61, a switch SW62, a switch SW63, and a NOT gate NOT61. According to design requirements, the switch SW61, the switch SW62, or the switch SW63 may be an NMOS transistor or other transistors. A first terminal of the resistor R61 is coupled to the CC pin 211 of the USB connector 210, to receive the primary voltage at the CC pin 211. A first terminal of the resistor R62 is coupled to a second terminal of the resistor R61. A first terminal of the switch SW61 is coupled to a second terminal of the resistor R62. A second terminal of the switch SW61 is coupled to a reference voltage VSSA. A first terminal of the switch SW62 is coupled to a second terminal of the resistor R61. A second terminal of the switch SW62 outputs the stepped down voltage V611 to a first input terminal of the voltage comparator 612. A first terminal of the switch SW63 is coupled to the first input terminal of the voltage comparator 612. A second terminal of the switch SW63 is coupled to the reference voltage VSSA. An output terminal of the NOT gate NOT61 is coupled to a control terminal of the switch SW63.

A control terminal of the switch SW61 and a control terminal of the switch SW62 are both controlled by an enable signal EN. An input terminal of the NOT gate NOT61 may receive the enable signal EN. According to the design requirements, the enable signal may be provided by the core circuit 230 or other circuits. When a logic state of the enable signal EN is "0", the switch SW61 and the switch SW62 are turned off and the switch SW63 is turned on, and therefore the overvoltage detection circuit 610 is disabled and the notification signal OVP1 is maintained in the logic state "0".

When a logic state of the enable signal EN is "1", the switch SW61 and the switch SW62 are turned on and the switch SW63 is turned off, and therefore the overvoltage detection circuit 610 is enabled.

Figure 7:
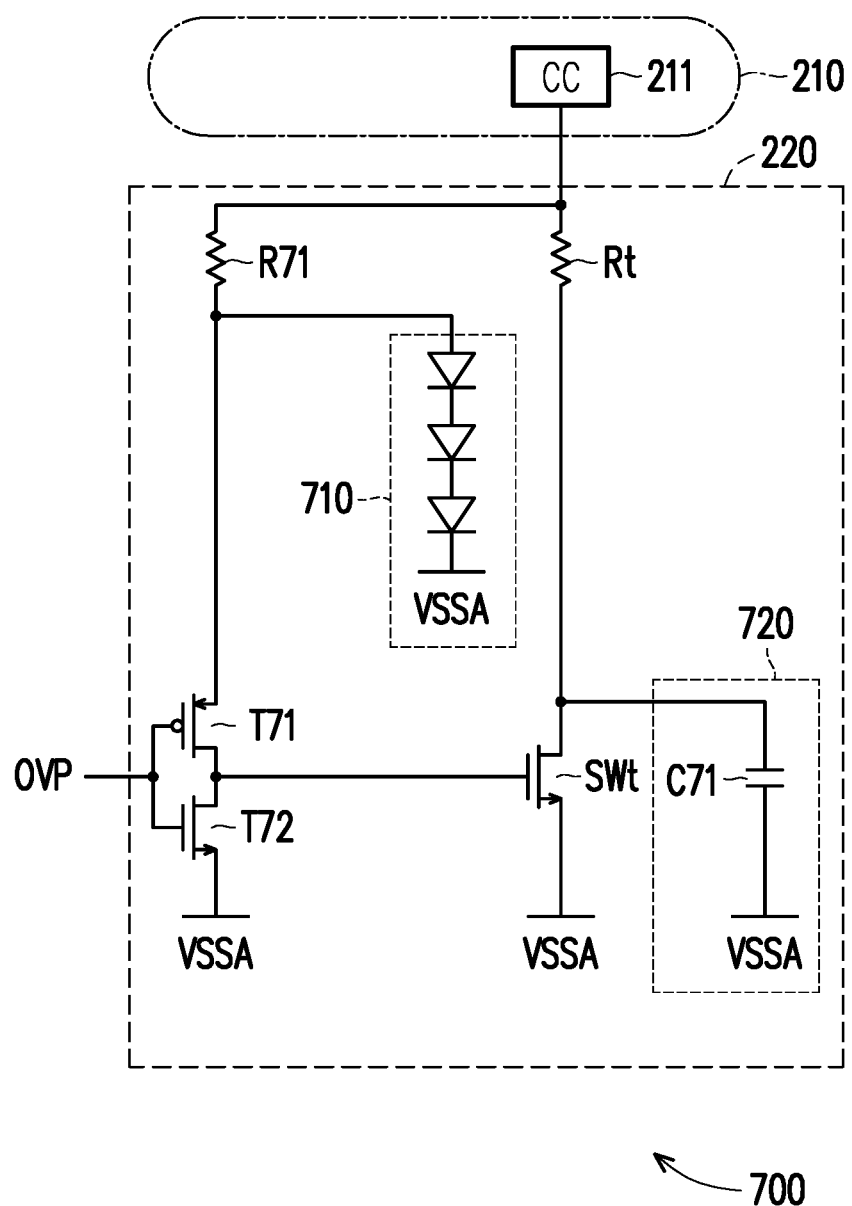
FIG. 7 is a schematic circuit block diagram of a terminal resistor circuit shown in FIG. 2 according to yet another embodiment of the invention.

FIG. 7 is a schematic circuit block diagram of a terminal resistor circuit 220 shown in FIG. 2 according to yet another embodiment of the invention. With reference to FIG. 2, FIG. 6, and FIG. 7, in an embodiment shown in FIG. 7, a first terminal of a terminal resistor Rt is coupled to a CC pin 211 of a USB connector 210. A second terminal of the terminal resistor Rt is coupled to a first terminal of a terminal switch SWt. A second terminal of the terminal switch SWt is coupled to a reference voltage VSSA. According to design requirements, the terminal switch SWt may be an NMOS transistor or other transistors.

In an embodiment shown in FIG. 7, the terminal resistor circuit 220 further includes a resistor R71, a transistor T71, a transistor T72, and a clamping circuit 710. A first terminal of the resistor R71 is coupled to the CC pin 211 of the USB connector 210. A first terminal (for example, a source) of the transistor T71 is coupled to a second terminal of the resistor R71. A second terminal (for example, a drain) of the transistor T71 and a second terminal (for example, a drain) of the transistor T72 are coupled to a control terminal of the terminal switch SWt. A control terminal (for example, a gate) of the transistor T71 and a control terminal (for example, a gate) of the transistor T72 are coupled to an overvoltage protection circuit 240 to receive a control signal OVP. A first terminal (for example, a source) of the transistor T72 is coupled to the reference voltage VSSA. According to the design requirements, the transistor T71 may be a P channel metal oxide semiconductor (hereinafter referred to as NMOS) transistor or other transistors, and the transistor T72 may be an NMOS transistor or other transistors.

The clamping circuit 710 is coupled to the first terminal of the transistor T71. The clamping circuit 710 may restrain a voltage at the first terminal of the transistor T71 below a certain predetermined voltage level. The implementation of the clamping circuit 710 may be determined in accordance with design requirements. For example, in an embodiment shown in FIG. 7, the clamping circuit 710 includes a plurality of diodes connected to each other in series. An anode of a diode string is coupled to the first terminal of the transistor T71, and a cathode of the diode string is coupled to the reference voltage VSSA. A number of diodes of the diode string may determine the predetermined voltage level of the clamping circuit 710. In an embodiment shown in FIG. 7, the clamping circuit 710 is connected to three diodes in series, but is not limited thereto.

In an embodiment shown in FIG. 7, the terminal resistor circuit 220 may further selectively configure an initial protection circuit 720. The initial protection circuit 720 is coupled to the first terminal of the terminal switch SWt. When an overvoltage event occurs at the CC pin 211, the initial protection circuit 720 may step down the voltage at the first terminal of the terminal switch SWt earlier before the terminal switch SWt is turned on. Therefore, the initial protection circuit 720 may reduce the voltage across two ends of the terminal switch SWt at the beginning of the occurrence of the overvoltage event, to prevent the terminal switch SWt from being broken down (damaged). The implementation of the initial protection circuit 720 may be determined in accordance with the design requirements. For example, in an embodiment shown in FIG. 7, the initial protection circuit 720 includes a capacitor C71. A first terminal of the capacitor C71 is coupled to the first terminal of the terminal switch SWt. A second terminal of the capacitor C71 is coupled to the reference voltage VSSA.

Figure 8:
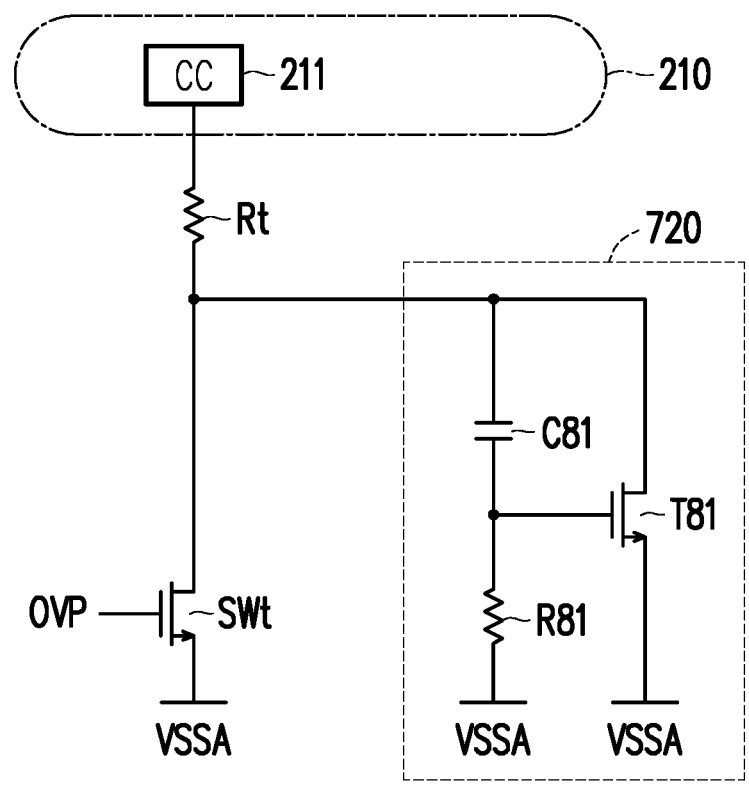
FIG. 8 is a schematic circuit block diagram of an initial protection circuit shown in FIG. 7 according to another embodiment of the invention.

FIG. 8 is a schematic circuit block diagram of an initial protection circuit 720 shown in FIG. 7 according to another embodiment of the invention. In an embodiment shown in FIG. 8, the initial protection circuit 720 includes a capacitor C81, a resistor R81, and a transistor T81. A first terminal of the capacitor C81 is coupled to a first terminal of a terminal switch SWt. A first terminal of a resistor R81 is coupled to a second terminal of the capacitor C81. A second terminal of the resistor R81 is coupled to a reference voltage VSSA. A first terminal (for example, a source) of the transistor T81 is coupled to the reference voltage VSSA. A control terminal (for example, a gate) of a transistor T81 is coupled to a second terminal of the capacitor C81 and the first terminal of the resistor R81. A second terminal (for example, a drain) of the transistor T81 is coupled to the first terminal of the terminal switch SWt. According to design requirements, the transistor T81 may be an NMOS transistor or other transistors.

Figure 9:
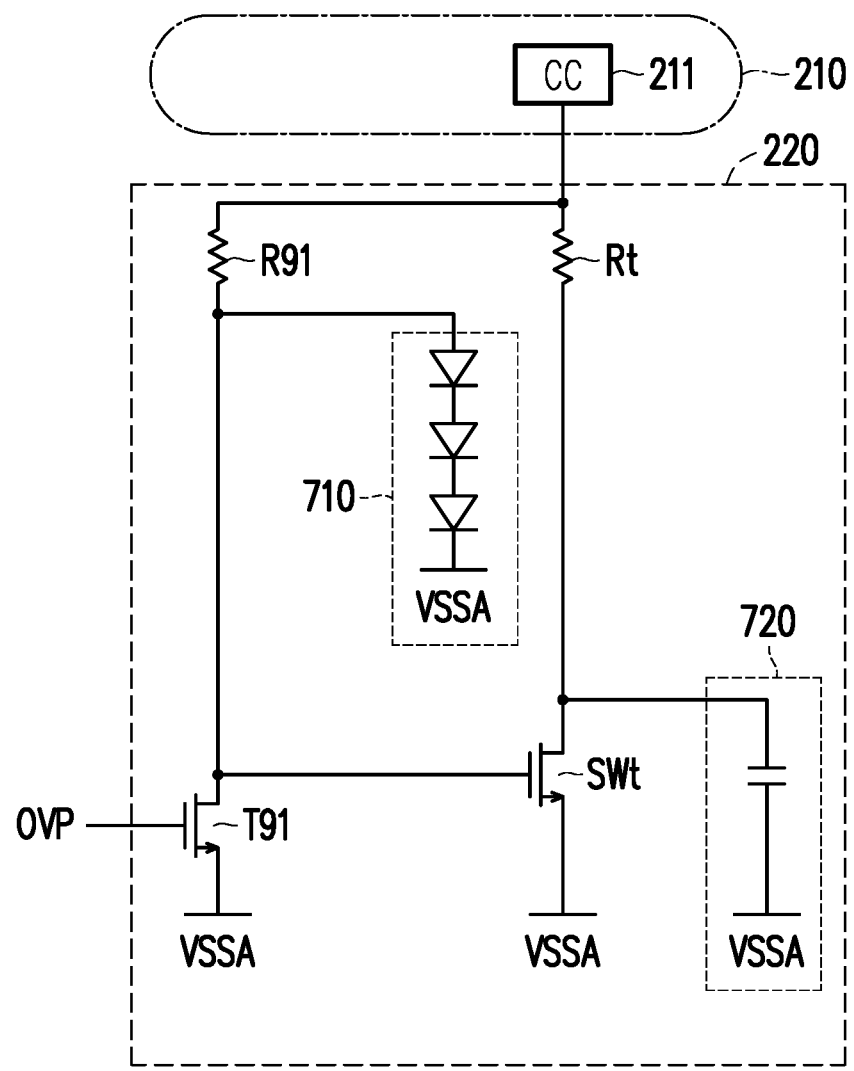
FIG. 9 is a schematic circuit block diagram of a terminal resistor circuit shown in FIG. 2 according to still another embodiment of the invention.

FIG. 9 is a schematic circuit block diagram of a terminal resistor circuit 220 shown in FIG. 2 according to still another embodiment of the invention. With reference to FIG. 2, FIG. 6, and FIG. 9, in an embodiment shown in FIG. 9, the terminal resistor circuit 220 includes a resistor R91, a transistor T91, a clamping circuit 710, an initial protection circuit 720, a terminal resistor Rt, and a terminal switch SWt. A first terminal of the resistor R91 is coupled to a CC pin 211 of a USB connector 210. A first terminal (for example, a source) of the transistor T91 is coupled to a reference voltage VSSA. A control terminal (for example, a gate) of the transistor T91 is coupled to an overvoltage protection circuit 240, to receive a control signal OVP. A second terminal (for example, a drain) of the transistor T91 is coupled to a second terminal of the resistor R91 and a control terminal of the terminal switch SWt. According to design requirements, the transistor T91 may be an NMOS transistor or other transistors. The resistor R91, the transistor T91, the clamping circuit 710, the terminal resistor Rt, and the terminal switch SWt shown in FIG. 9 may be analogized with reference to related descriptions of the resistor R71, the transistor T72, the clamping circuit 710, the terminal resistor Rt, and the terminal switch SWt that are shown in FIG. 7. The initial protection circuit 720 shown in FIG. 9 may be analogized with reference to the related description of the initial protection circuit 720 shown in FIG. 7 or FIG. 8, and therefore the descriptions thereof are omitted.

Figure 10:
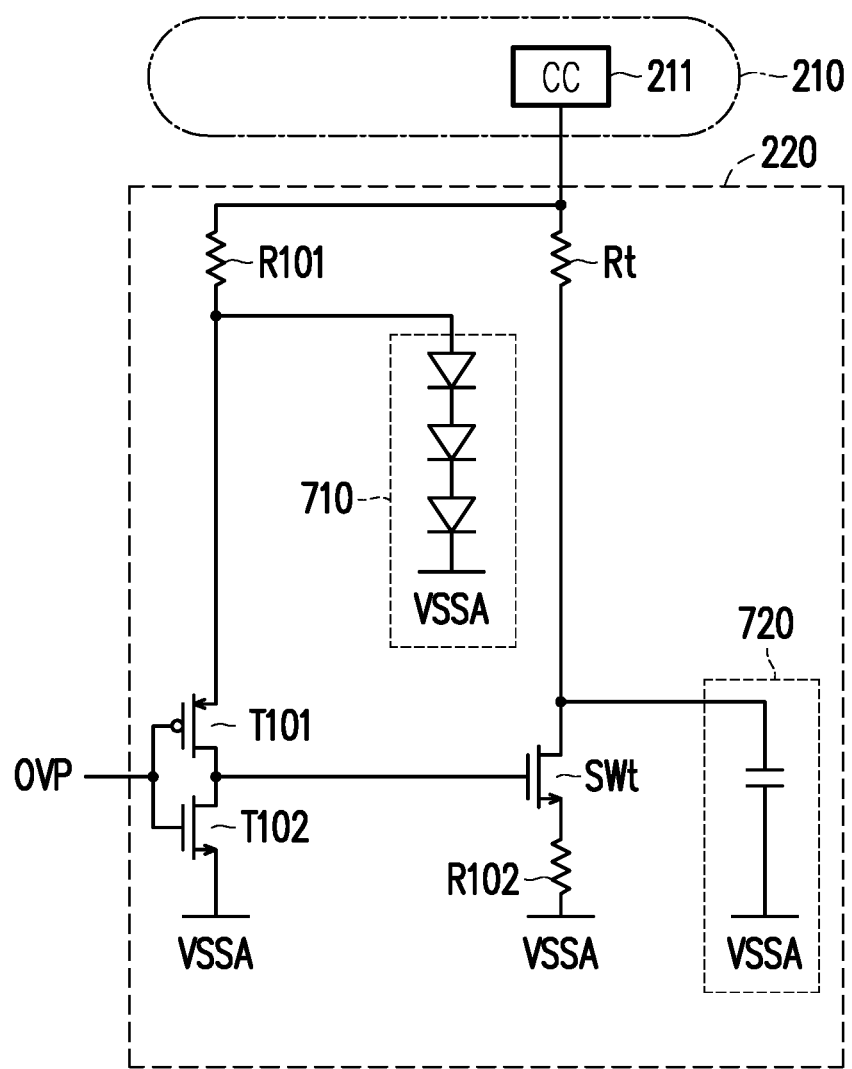
FIG. 10 is a schematic circuit block diagram of a terminal resistor circuit shown in FIG. 2 according to yet another embodiment of the invention.

FIG. 10 is a schematic circuit block diagram of a terminal resistor circuit 220 shown in FIG. 2 according to a further embodiment of the invention. With reference to FIG. 2, FIG. 6, and FIG. 10, in an embodiment shown in FIG. 10, the terminal resistor circuit 220 includes a resistor R101, a transistor T101, a transistor T102, a clamping circuit 710, a terminal resistor Rt, a terminal switch SWt, a resistor R102, and an initial protection circuit 720. The resistor R101, the transistor T101, the transistor T102, the clamping circuit 710, the terminal resistor Rt, and the terminal switch SWt shown in FIG. 10 may be analogized with reference to related descriptions of the resistor R71, the transistor T71, the transistor T72, the clamping circuit 710, the terminal resistor Rt, and the terminal switch SWt that are shown in FIG. 7. The initial protection circuit 720 shown in FIG. 10 may be analogized with reference to the related description of the initial protection circuit 720 shown in FIG. 7 or FIG. 8, and therefore the descriptions thereof are omitted.

In an embodiment shown in FIG. 10, a first terminal of the resistor R102 is coupled to a second terminal of the terminal switch SWt. A second terminal of the resistor R102 is coupled to a reference voltage VSSA. When a current flows through the resistor R102, the resistor R102 may raise a source voltage of the terminal switch SWt to reduce a gate source voltage (generally referred to as Vgs) of the terminal switch SWt. A smaller Vgs of the terminal switch SWt leads to a smaller leakage current of the terminal switch SWt.

The circuit shown in FIG. 10 may further be modified according to design requirements. For example, the transistor T101 shown in FIG. 10 may be omitted according to the design requirements, so that a second terminal of the transistor T102 is coupled to a second terminal of the resistor R101 and a control terminal of the terminal switch SWt. As shown in FIG. 9, the second terminal of the transistor T91 is coupled to the second terminal of the resistor R91 and the control terminal of the terminal switch SWt.

Figure 11:
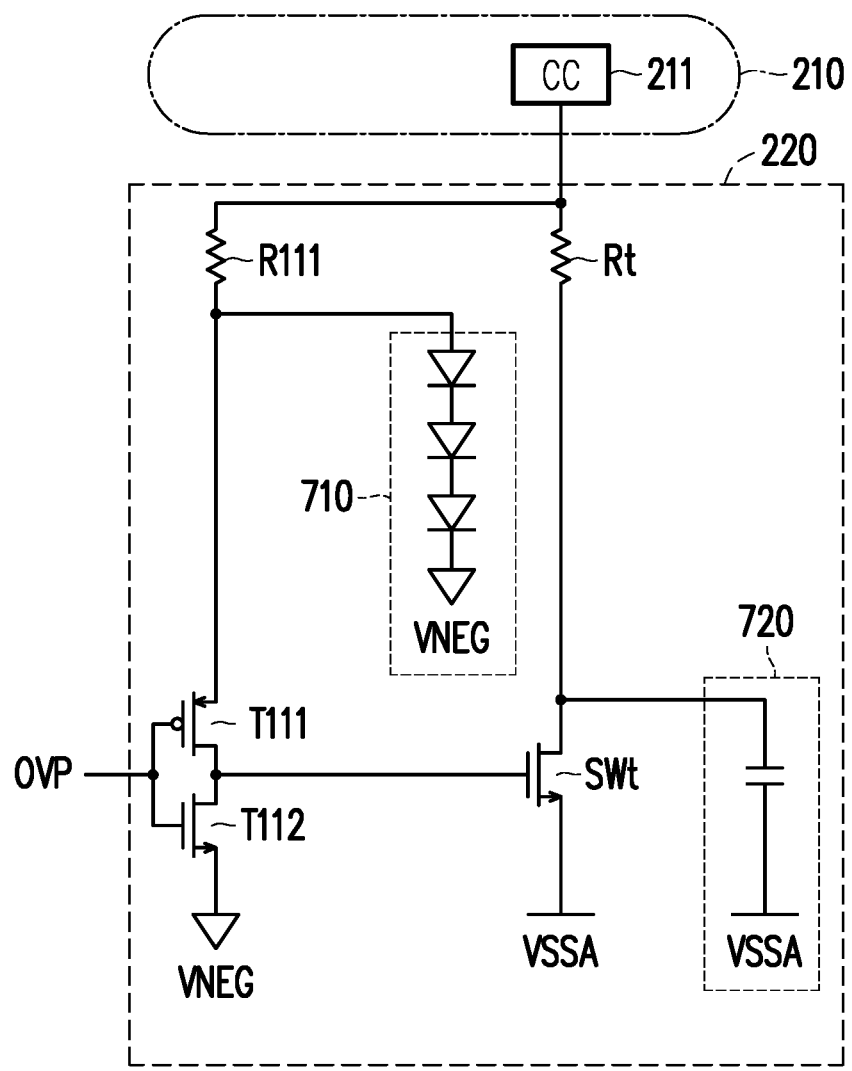
FIG. 11 is a schematic circuit block diagram of a terminal resistor circuit shown in FIG. 2 according to still another embodiment of the invention.

FIG. 11 is a schematic circuit block diagram of a terminal resistor circuit 220 shown in FIG. 2 according to still another embodiment of the invention. With reference to FIG. 2, FIG. 6, and FIG. 11, in an embodiment shown in FIG. 11, the terminal resistor circuit 220 includes a resistor R111, a transistor T111, a transistor T112, a clamping circuit 710, a terminal resistor Rt, a terminal switch SWt, and an initial protection circuit 720. The resistor R111, the transistor T111, the transistor T112, the clamping circuit 710, the terminal resistor Rt, and the terminal switch SWt shown in FIG. 11 may be analogized with reference to related descriptions of the resistor R71, the transistor T71, the transistor T72, the clamping circuit 710, the terminal resistor Rt, and the terminal switch SWt that are shown in FIG. 7. The initial protection circuit 720 shown in FIG. 11 may be analogized with reference to the related description of the initial protection circuit 720 shown in FIG. 7 or FIG. 8, and therefore the descriptions thereof are omitted.

In an embodiment shown in FIG. 11, a second terminal of the terminal switch SWt is coupled to a reference voltage VSSA (for example, a ground voltage), and a first terminal (for example, the source) of the transistor T112 and the clamping circuit 710 are coupled to a negative voltage VNEG lower than a reference voltage VSSA. A level of the negative voltage VNEG may be determined according to the design requirements. When the transistor T112 is turned on, the negative voltage VNEG is transmitted to a control terminal (for example, a gate) of the terminal switch SWt. The negative voltage VNEG may reduce a Vgs (a gate source voltage) of the terminal switch SWt. A smaller Vgs of the terminal switch SWt leads to a smaller leakage current of the terminal switch SWt.

Figure 12:
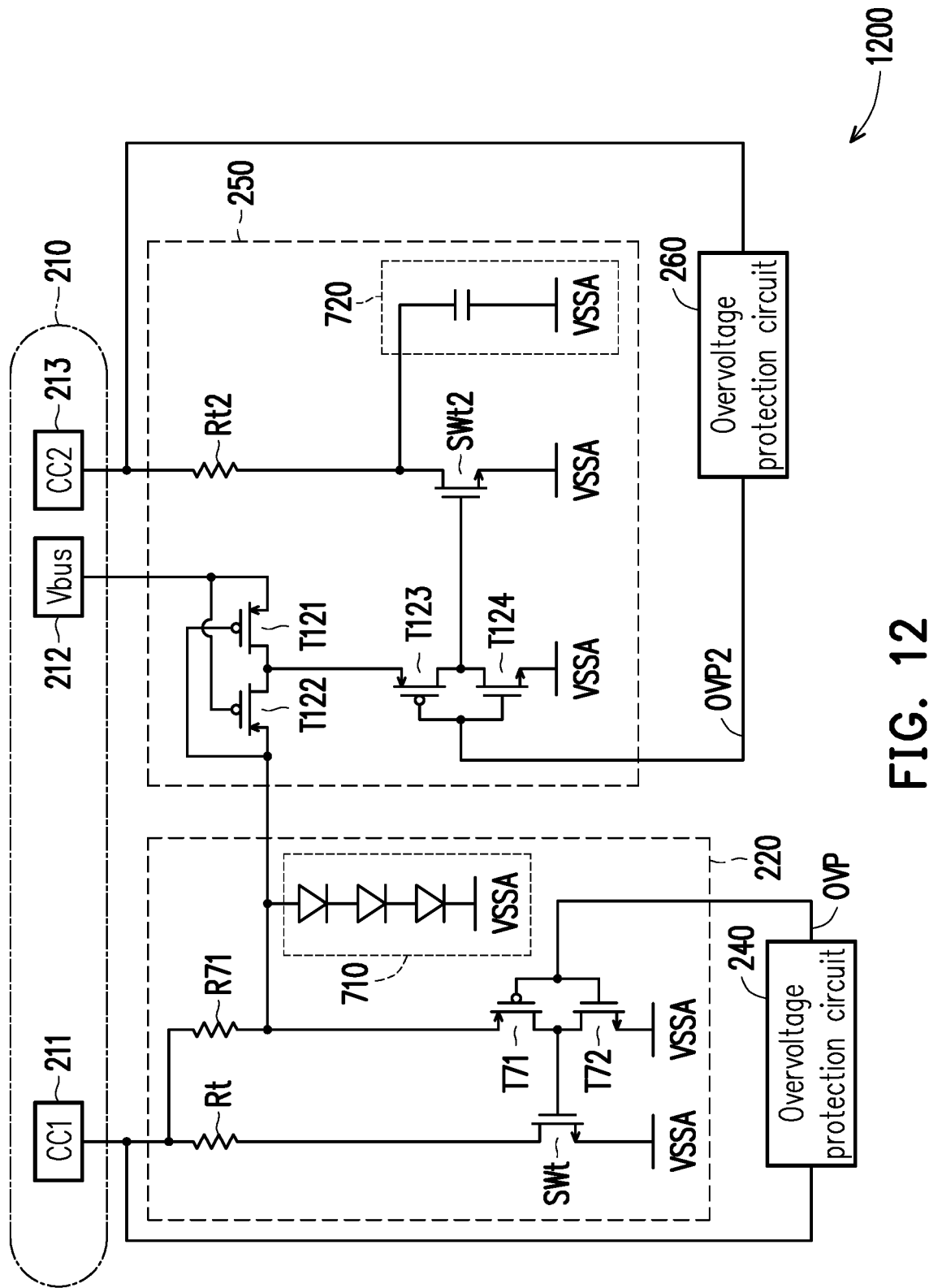
FIG. 12 is a schematic circuit block diagram of a USB apparatus according to another embodiment of the invention.

FIG. 12 is a schematic circuit block diagram of a USB apparatus 1200 according to another embodiment of the invention. In an embodiment shown in FIG. 12, the USB apparatus 1200 includes a USB connector 210, a terminal resistor circuit 220, an overvoltage protection circuit 240, a terminal resistor circuit 250, and an overvoltage protection circuit 260. The USB connector 210 includes a CC pin 211, a Vbus pin 212, and a CC pin 213. The Vbus pin 212 shown in FIG. 12 may be analogized with reference to the related description of the Vbus pin 112 shown in FIG. 1. The CC pin 213 shown in FIG. 12 may be analogized with reference to the related description of the CC pin 211. Specifically, the CC pin 211 is a CC pin (for example, a "CC1" pin conforming to the USB standard) of the USB connector 210, and the CC pin 213 is another CC pin (for example, a "CC2" pin conforming to the USB standard) of the USB connector 210. The terminal resistor circuit 220 shown in FIG. 12 may be analogized with reference to the related description of the terminal resistor circuit 220 shown in FIG. 2 or FIG. 7. The overvoltage protection circuit 240 shown in FIG. 12 may be analogized with reference to the related description of the overvoltage protection circuit 240 shown in FIG. 2 or FIG. 6, and therefore the descriptions thereof are omitted. Alternatively, the terminal resistor circuit 220 shown in FIG. 12 may be analogized with reference to the related description of the terminal resistor circuit 220 shown in FIG. 9, FIG. 10, or FIG. 11.

In an embodiment shown in FIG. 12, the terminal resistor circuit 250 includes a terminal resistor Rt2 and a terminal switch SWt2 connected to each other in series. A first terminal of the terminal resistor Rt2 is coupled to the CC pin 213 of the USB connector 210. A second terminal of the terminal resistor Rt2 is coupled to a first terminal of the terminal switch SWt2. A second terminal of the terminal switch SWt2 is coupled to a reference voltage VSSA. During a configuration detection period, the terminal switch SWt2 is turned on, and therefore a core circuit (not shown) of the USB apparatus 1200 may determine, according to a voltage level of the CC pin 213, whether a role of an external apparatus (not shown) is a "host", or the external apparatus may determine, according to a voltage level of a CC pin, whether the USB apparatus 1200 is a "device". The terminal resistor Rt2 and the terminal switch SWt2 may be analogized with reference to related descriptions of the terminal resistor Rt and the terminal switch SWt.

The overvoltage detection circuit 260 is coupled to the CC pin 213 of a USB connector 210 to detect an overvoltage event. The overvoltage protection circuit 260 is coupled to a terminal resistor circuit 250, to affect the terminal switch SWt2. During a power saving period after the configuration detection period ends, the overvoltage protection circuit 260 controls the terminal resistor circuit 250 via a control signal OVP2, to turn off the terminal switch SWt2. When the overvoltage event occurs at the CC pin 213, the overvoltage protection circuit 260 controls the terminal resistor circuit 250 to turn on the terminal switch SWt2. The overvoltage protection circuit 260 and the control signal OVP2 may be analogized with reference to the related descriptions of the overvoltage protection circuit 240 and the control signal OVP, and therefore the descriptions thereof are omitted.

In an embodiment shown in FIG. 12, the terminal resistor circuit 250 further includes a transistor T121, a transistor T122, a transistor T123, and a transistor T124. A first terminal (for example, a source) of the transistor T121 and a control terminal (for example, a gate) of the transistor T122 are coupled to the Vbus pin 212 of the USB connector 210. A control terminal (for example, a gate) of the transistor T121 and a first terminal (for example, a source) of the transistor T122 are coupled to a second terminal of a resistor R71. A first terminal (for example, a source) of a transistor T123 is coupled to a second terminal (for example, a drain) of the transistor T121 and a second terminal (for example, a drain) of the transistor T122. A control terminal (for example, a gate) of the transistor T123 is coupled to the overvoltage protection circuit 260, to receive the control signal OVP2. The control signal OVP2 may be analogized with reference to the related description of the control signal OVP. A second terminal (for example, a drain) of the transistor T123 is coupled to a control terminal of the terminal switch SWt2. When the transistor T123 is turned on, the Vbus pin 212 or the resistor R71 may supply a bias voltage to the terminal switch SWt2.

A first terminal (for example, a source) of the transistor T124 is coupled to a reference voltage VSSA. A control terminal (for example, a gate) of the transistor T124 is coupled to the overvoltage protection circuit 260, to receive the control signal OVP2. A second terminal (for example, a drain) of the transistor T124 is coupled to the control terminal of the terminal switch SWt2. The terminal resistor circuit 250, the transistor T123, and the transistor T124 may be analogized with reference to related descriptions of the terminal resistor circuit 220, the transistor T71, and the transistor T72, and therefore the descriptions thereof are omitted.

Figure 13:
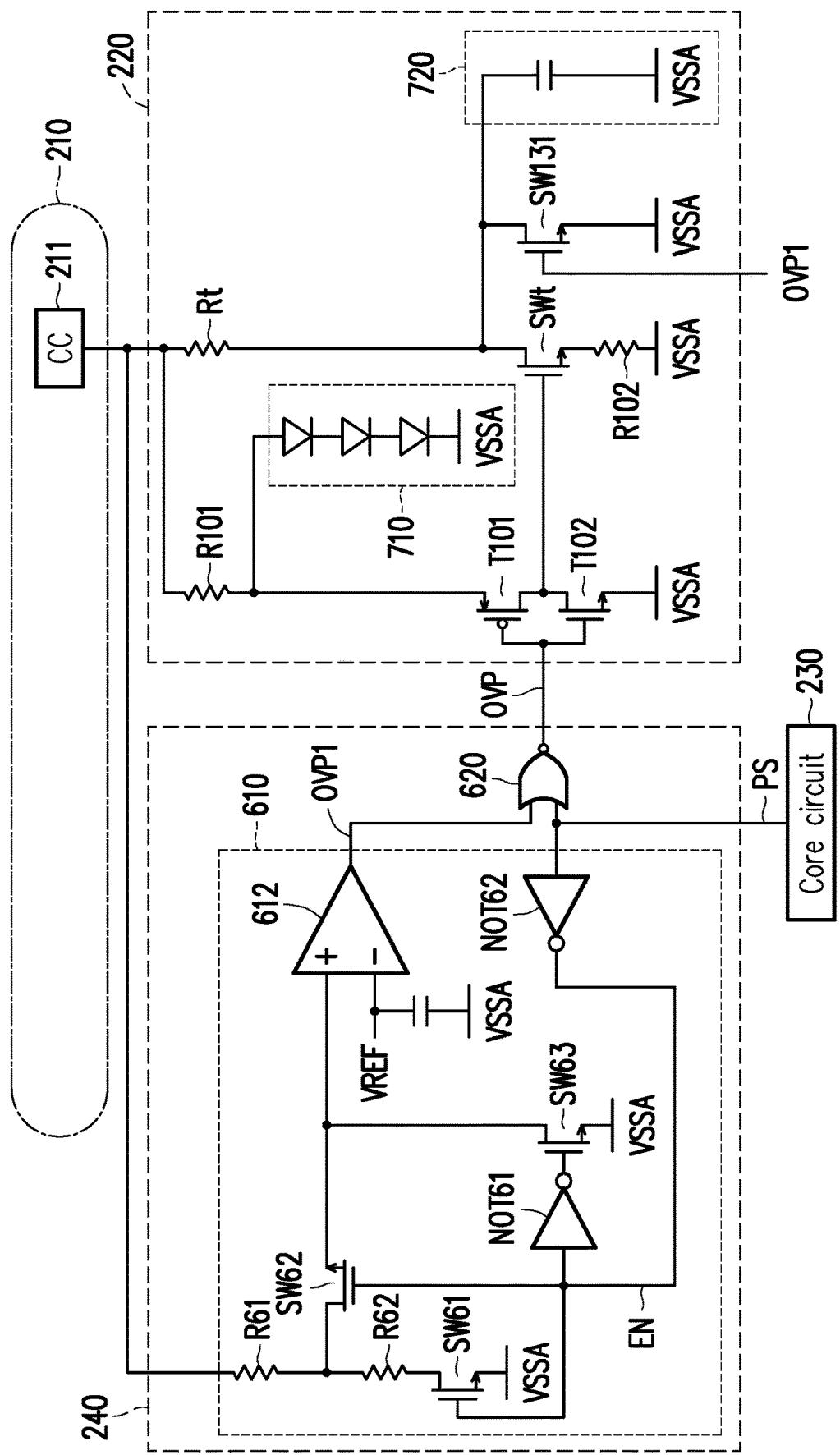
FIG. 13 is a schematic circuit block diagram of a terminal resistor circuit and an overvoltage protection circuit shown in FIG. 2 according to yet another embodiment of the invention.

FIG. 13 is a schematic circuit block diagram of a terminal resistor circuit 220 and an overvoltage protection circuit 240 shown in FIG. 2 according to a further embodiment of the invention. The overvoltage protection circuit 240 shown in FIG. 13 may be analogized with reference to the related description of the overvoltage protection circuit 240 shown in FIG. 6, and therefore the descriptions thereof are omitted. In an embodiment shown in FIG. 13, the overvoltage protection circuit 240 further includes a NOT gate NOT62. An input terminal of the NOT gate NOT62 is coupled to a core circuit 230, to receive a control signal PS. An output terminal of the NOT gate NOT62 is coupled to a control terminal of a switch SW61, a control terminal of a switch SW62, and an input terminal of a NOT gate NOT61, to provide an enable signal EN.

The terminal resistor circuit 220 shown in FIG. 13 may be analogized with reference to the related description of the terminal resistor circuit 220 shown in FIG. 10, and therefore the descriptions thereof are omitted. In an embodiment shown in FIG. 13, the terminal resistor circuit 220 further includes a switch SW131. A first terminal of the switch SW131 is coupled to a second terminal of a terminal resistor Rt. A second terminal of the switch SW131 is coupled to a reference voltage VSSA. A control terminal of the switch SW131 is coupled to an output terminal of an overvoltage detection circuit 610 to receive a notification signal OVP1. The overvoltage detection circuit 610 may detect an overvoltage event at a CC pin 211. The overvoltage detection circuit 610 may correspondingly output a notification signal OVP1 to a NOR gate 620 and the switch SW131 depending on occurrence of the overvoltage event. When the overvoltage event occurs at the CC pin 211, the overvoltage detection circuit 610 may immediately turn on the switch SW131 to step down a voltage at a first terminal of a terminal switch SWt earlier. Therefore, the overvoltage detection circuit 610 and the switch SW131 may prevent the terminal switch SWt from being broken down (damaged).

Figure 14:
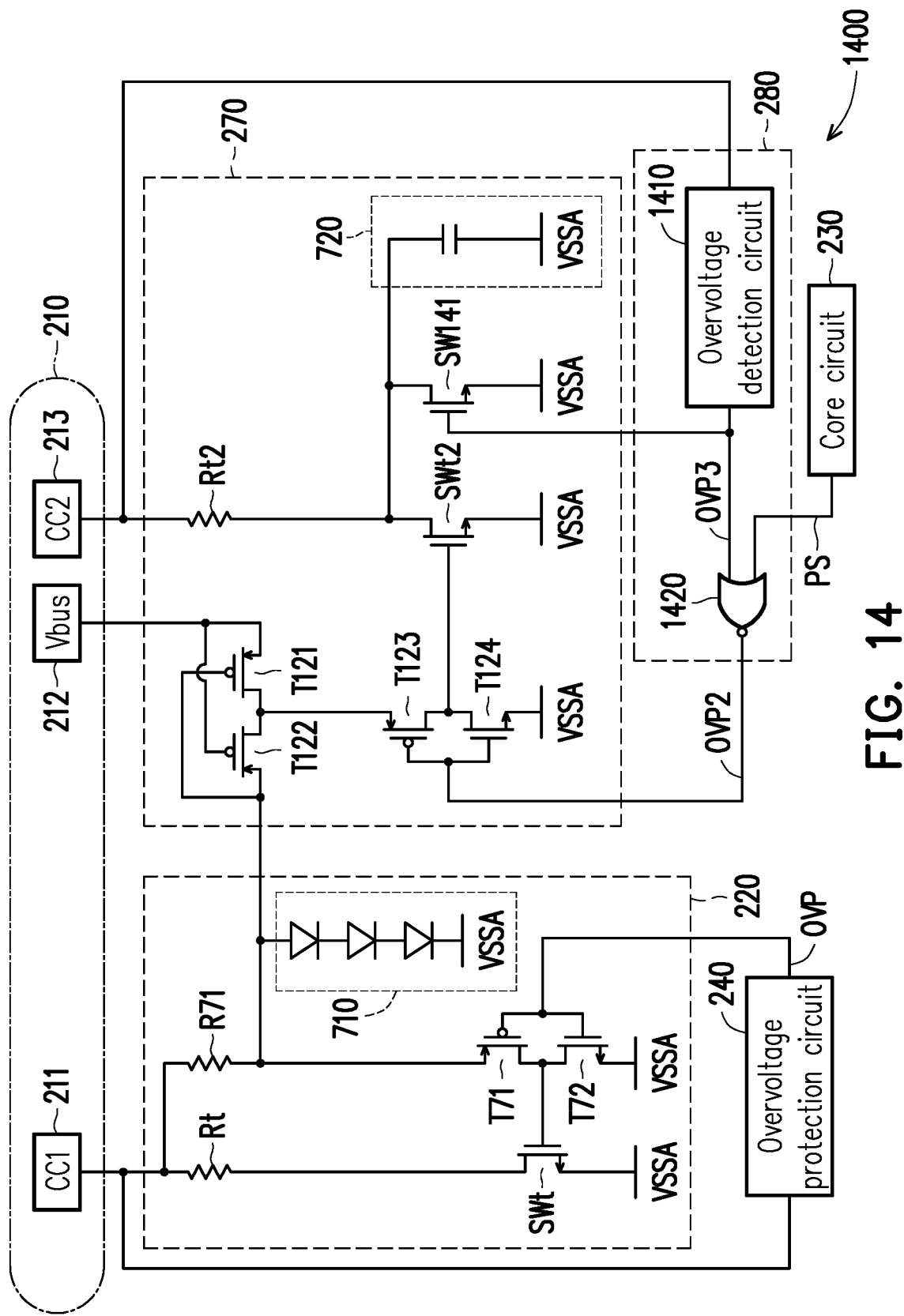
FIG. 14 is a schematic circuit block diagram of a USB apparatus according to still another embodiment of the invention.

FIG. 14 is a schematic circuit block diagram of a USB apparatus 1400 according to still another embodiment of the invention. In an embodiment shown in FIG. 14, the USB apparatus 1400 includes a USB connector 210, a terminal resistor circuit 220, a core circuit 230, an overvoltage protection circuit 240, a terminal resistor circuit 270, and an overvoltage protection circuit 280. The USB connector 210, the CC pin 211, the Vbus pin 212, and the CC pin 213 shown in FIG. 14 may be analogized with reference to related descriptions of the USB connector 210, the CC pin 211, and the Vbus pin 212, and the CC pin 213 that are shown in FIG. 12, and therefore the descriptions thereof are omitted. The terminal resistor circuit 220 shown in FIG. 14 may be analogized with reference to the related description of the terminal resistor circuit 220 shown in FIG. 2 or FIG. 7. The overvoltage protection circuit 240 shown in FIG. 14 may be analogized with reference to the related description of the overvoltage protection circuit 240 shown in FIG. 2 or FIG. 6, and therefore the descriptions thereof are omitted. Alternatively, the terminal resistor circuit 220 shown in FIG. 14 may be analogized with reference to the related description of the terminal resistor circuit 220 shown in FIG. 9, FIG. 10, or FIG. 11.

In an embodiment shown in FIG. 14, the overvoltage protection circuit 280 includes an overvoltage detection circuit 1410 and a NOR gate 1420. The overvoltage detection circuit 1410 is coupled to the CC pin 213 of a USB connector 210 to detect an overvoltage event. The overvoltage detection circuit 1410 may correspondingly output a notification signal OVP3 to the NOR gate 1420 according to occurrence of the overvoltage event. A first input terminal of the NOR gate 1420 is coupled to an output terminal of the overvoltage detection circuit 1410 to receive the notification signal OVP3. A second input terminal of the NOR gate 1420 receives a power saving signal PS provided by a core circuit 230. An output terminal of the NOR gate 1420 is coupled to a terminal resistor circuit 270, to affect a terminal switch SWt2. The overvoltage detection circuit 1410 and the NOR gate 1420 that are shown in FIG. 14 may be analogized with reference to related descriptions of the overvoltage detection circuit 610 and the NOR gate 620 that are shown in FIG. 6, the power saving signal PS and the notification signal OVP3 shown in FIG. 14 may be analogized with reference to related descriptions of the power saving signal PS and the notification signal OVP1 that are shown in FIG. 6, and therefore the descriptions thereof are omitted.

In an embodiment shown in FIG. 14, the terminal resistor circuit 270 includes a transistor T121, a transistor T122, a transistor T123, and a transistor T124, a terminal resistor Rt2, and a terminal switch SWt2. The terminal resistor circuit 270, the transistor T121, the transistor T122, the transistor T123, the transistor T124, the terminal resistor Rt2, and the terminal switch SWt2 shown in FIG. 14 may be analogized with reference to related descriptions of the terminal resistor circuit 250, the transistor T121, the transistor T122, the transistor T123, the transistor T124, the terminal resistor Rt2, and the terminal switch SWt2 that are shown in FIG. 12, and therefore the descriptions thereof are omitted.

In an embodiment shown in FIG. 14, the terminal resistor circuit 270 further includes a switch SW141. A first terminal of the switch SW141 is coupled to a second terminal of the resistor Rt2. A second terminal of the switch SW141 is coupled to a reference voltage VSSA. A control terminal of the switch SW141 is coupled to an output terminal of an overvoltage detection circuit 1410 to receive a notification signal OVP3. The overvoltage detection circuit 1410 may detect an overvoltage event at a CC pin 213. The overvoltage detection circuit 1410 may correspondingly output the notification signal OVP3 to a NOR gate 1420 and the switch SW141 depending on occurrence of the overvoltage event. When the overvoltage event occurs at the CC pin 213, the overvoltage detection circuit 1410 may immediately turn on the switch SW141 to step down a voltage at a first terminal of the terminal switch SWt2 earlier. Therefore, the overvoltage detection circuit 1410 and the switch SW141 may prevent the terminal switch SWt2 from being broken down (damaged).

Based on the above, according to the USB apparatus and the operation method thereof in the embodiments of the invention, it may be detected whether the overvoltage event occurs at the CC pin of the USB connector 210. When the overvoltage event occurs at the CC pin, the overvoltage protection circuit may control the terminal resistor circuit to turn on the terminal switch in the terminal resistor circuit to instantly step down a voltage across the terminal switch.

Therefore, according to the USB apparatus and the operation method thereof, the terminal switch may be protected.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A USB (universal serial bus) apparatus, comprising:
   a USB connector;
   a first terminal resistor circuit, comprising a first terminal resistor and a first terminal switch connected to each other in series, wherein the first terminal resistor and the first terminal switch jointly provide a current path, one terminal of the current path is coupled to a first configuration channel pin of the USB connector, and another terminal of the current path is coupled to a first reference voltage, wherein the first terminal switch is turned on during a configuration detection period; and
   a first overvoltage protection circuit, coupled to the first configuration channel pin of the USB connector to detect an overvoltage event and coupled to the first terminal resistor circuit to affect the first terminal switch, wherein the first overvoltage protection circuit controls the first terminal resistor circuit to turn off the first terminal switch during a power saving period after the configuration detection period ends, and the first overvoltage protection circuit controls the first terminal resistor circuit to turn on the first terminal switch when the overvoltage event occurs at the first configuration channel pin.

2. The USB apparatus according to claim 1, wherein the first terminal resistor circuit is an Ra resistor or an Rd resistor that conforms to USB standard specifications.

3. The USB apparatus according to claim 1, wherein a first terminal of the first terminal resistor is coupled to the first configuration channel pin of the USB connector, a second terminal of the first terminal resistor is coupled to a first terminal of the first terminal switch, a second terminal of the first terminal switch is coupled to the first reference voltage, and a control terminal of the first terminal switch is coupled to an output terminal of the first overvoltage protection circuit.

4. The USB apparatus according to claim 1, wherein the first overvoltage protection circuit comprises:
   an overvoltage detection circuit, coupled to the first configuration channel pin of the USB connector to detect the overvoltage event and correspondingly outputting a notification signal according to occurrence of the overvoltage event; and
   a NOR gate, having a first input terminal coupled to an output terminal of the overvoltage detection circuit to receive the notification signal, wherein a second input terminal of the NOR gate receives a power saving signal, and an output terminal of the NOR gate is coupled to the first terminal resistor circuit to affect the first terminal switch,
   wherein the power saving signal defines the power saving period, and the notification signal indicates the occurrence of the overvoltage event.

5. The USB apparatus according to claim 1, wherein a first terminal of the first terminal resistor is coupled to the first configuration channel pin of the USB connector, a second terminal of the first terminal resistor is coupled to a first terminal of the first terminal switch, a second terminal of the first terminal switch is coupled to the first reference voltage, and the first terminal resistor circuit further comprises:
   a first resistor, having a first terminal coupled to the first configuration channel pin of the USB connector;
   a first transistor, having a first terminal coupled to a second terminal of the first resistor, wherein a control terminal of the first transistor is coupled to the first overvoltage protection circuit to receive a first control signal, and a second terminal of the first transistor is coupled to a control terminal of the first terminal switch; and
   a second transistor, having a first terminal coupled to the first reference voltage or a negative voltage lower than the first reference voltage, wherein a control terminal of the second transistor is coupled to the first overvoltage protection circuit to receive the first control signal, and a second terminal of the second transistor is coupled to the control terminal of the first terminal switch.

6. The USB apparatus according to claim 1, wherein the first reference voltage is a ground voltage.

7. The USB apparatus according to claim 1, wherein a first terminal of the first terminal resistor is coupled to the first configuration channel pin of the USB connector, a second terminal of the first terminal resistor is coupled to a first terminal of the first terminal switch, a second terminal of the first terminal switch is coupled to the first reference voltage, and the first terminal resistor circuit further comprises:
   a first resistor, having a first terminal coupled to the first configuration channel pin of the USB connector; and
   a transistor, having a first terminal coupled to the first reference voltage, wherein a control terminal of the transistor is coupled to the first overvoltage protection circuit to receive a control signal, a second terminal of the transistor is coupled to a second terminal of the first resistor, and the second terminal of the transistor is coupled to a control terminal of the first terminal switch.

8. The USB apparatus according to claim 1, wherein a first terminal of the first terminal resistor is coupled to the first configuration channel pin of the USB connector, a second terminal of the first terminal resistor is coupled to a first terminal of the first terminal switch, and the first terminal resistor circuit further comprises:
   a first resistor, having a first terminal coupled to the first configuration channel pin of the USB connector;
   a first transistor, having a first terminal coupled to a second terminal of the first resistor, wherein a control terminal of the first transistor is coupled to the first overvoltage protection circuit to receive a control signal, and a second terminal of the first transistor is coupled to a control terminal of the first terminal switch;
   a second transistor, having a first terminal coupled to the first reference voltage, wherein a control terminal of the second transistor is coupled to the first overvoltage protection circuit to receive the control signal, and a second terminal of the second transistor is coupled to the control terminal of the first terminal switch; and
   a second resistor, having a first terminal coupled to a second terminal of the first terminal switch, wherein a second terminal of the second resistor is coupled to the first reference voltage.

9. The USB apparatus according to claim 3, wherein the first overvoltage protection circuit comprises:
   an overvoltage detection circuit, coupled to the first configuration channel pin of the USB connector to detect the overvoltage event and correspondingly outputting a notification signal according to occurrence of the overvoltage event;

an OR gate, having a first input terminal coupled to an output terminal of the overvoltage detection circuit to receive the notification signal, wherein a second input terminal of the OR gate receives a power saving signal, and an output terminal of the OR gate is coupled to the control terminal of the first terminal switch, wherein the power saving signal defines the power saving period, and the notification signal indicates the occurrence of the overvoltage event.

10. The USB apparatus according to claim 4, wherein the overvoltage detection circuit comprises:

a step-down circuit, coupled to the first configuration channel pin of the USB connector to receive a primary voltage of the first configuration channel pin and configured to step down the primary voltage of the first configuration channel pin to output a stepped down voltage; and a voltage comparator, wherein a first input terminal of the voltage comparator is coupled to an output terminal of the step-down circuit to receive the stepped down voltage, a second input terminal of the voltage comparator receives a second reference voltage, and an output terminal of the voltage comparator is coupled to the first input terminal of the NOR gate.

11. The USB apparatus according to claim 4, wherein a first terminal of the first terminal resistor is coupled to the first configuration channel pin of the USB connector, a second terminal of the first terminal resistor is coupled to a first terminal of the first terminal switch, a second terminal of the first terminal switch is coupled to the first reference voltage, and the first terminal resistor circuit further comprises:

a first switch, having a first terminal coupled to the second terminal of the first terminal resistor, wherein a second terminal of the first switch is coupled to the first reference voltage, and a control terminal of the first switch is coupled to an output terminal of the overvoltage detection circuit to receive the notification signal.

12. The USB apparatus according to claim 5, wherein the first terminal resistor circuit further comprises:

a clamping circuit, having a first terminal coupled to the first terminal of the first transistor, wherein a second terminal of the clamping circuit corresponds to the first terminal of the second transistor to be coupled to the first reference voltage or the negative voltage.

13. The USB apparatus according to claim 5, further comprising:

a second terminal resistor circuit, having a second terminal resistor and a second terminal switch connected to each other in series, wherein a first terminal of the second terminal resistor is coupled to a second configuration channel pin of the USB connector, a second terminal of the second terminal resistor is coupled to a first terminal of the second terminal switch, a second terminal of the second terminal switch is coupled to the first reference voltage, and the second terminal switch is turned on during the configuration detection period; and a second overvoltage protection circuit, coupled to the second configuration channel pin of the USB connector to detect an overvoltage event and coupled to the second terminal resistor circuit to affect the second terminal switch, wherein the second overvoltage protection circuit controls the second terminal resistor circuit to turn off the second terminal switch during the power saving period after the configuration detection period ends, and the second overvoltage protection circuit controls the second terminal resistor circuit to turn on the second terminal switch when the overvoltage event occurs at the second configuration channel pin.

14. The USB apparatus according to claim 7, wherein the first terminal resistor circuit further comprises:

a clamping circuit, coupled to the second terminal of the transistor.

15. The USB apparatus according to claim 10, wherein the step-down circuit comprises:

a first resistor, having a first terminal coupled to the first configuration channel pin of the USB connector to receive the primary voltage of the first configuration channel pin;

a second resistor, having a first terminal coupled to a second terminal of the first resistor;

a first switch, having a first terminal coupled to a second terminal of the second resistor, wherein a second terminal of the first switch is coupled to the first reference voltage, and a control terminal of the first switch is controlled by an enable signal;

a second switch, having a first terminal coupled to a second terminal of the first resistor, wherein a second terminal of the second switch outputs the stepped down voltage to the first input terminal of the voltage comparator, and a control terminal of the second switch is controlled by the enable signal;

a third switch, having a first terminal coupled to the first input terminal of the voltage comparator, wherein a second terminal of the third switch is coupled to the first reference voltage; and a NOT gate, having an input terminal configured to receive the enable signal, wherein an output terminal of the NOT gate is coupled to a control terminal of the third switch.

16. The USB apparatus according to claim 5, wherein the first terminal resistor circuit further comprises:

an initial protection circuit, coupled to the first terminal of the first terminal switch.

17. The USB apparatus according to claim 13, wherein the second terminal resistor circuit further comprises:

a first transistor, having a first terminal coupled to a power pin of the USB connector, wherein a control terminal of the first transistor is coupled to the second terminal of the first resistor;

a second transistor, having a first terminal coupled to the second terminal of the first resistor, wherein a control terminal of the second transistor is coupled to the power pin of the USB connector;

a third transistor, having a first terminal coupled to a second terminal of the first resistor and a second terminal of the second transistor, wherein a control terminal of the third transistor is coupled to the second overvoltage protection circuit to receive a second control signal, and a second terminal of the third transistor is coupled to a control terminal of the second terminal switch; and a fourth transistor, having a first terminal coupled to the first reference voltage, wherein a control terminal of the fourth transistor is coupled to the second overvoltage protection circuit to receive the second control signal, and a second terminal of the fourth transistor is coupled to the control terminal of the second terminal switch.

18. The USB apparatus according to claim 16, wherein the initial protection circuit comprises:
a capacitor, having a first terminal coupled to the first terminal of the first terminal switch, wherein a second terminal of the capacitor is coupled to the first reference voltage.

19. The USB apparatus according to claim 16, wherein the initial protection circuit comprises:
a capacitor, having a first terminal coupled to the first terminal of the first terminal switch;
a second resistor, having a first terminal coupled to a second terminal of the capacitor, wherein a second terminal of the second resistor is coupled to the first reference voltage; and
a third transistor, having a first terminal coupled to the first reference voltage, wherein a control terminal of the third transistor is coupled to the second terminal of the capacitor and the first terminal of the second resistor, and a second terminal of the third transistor is coupled to the first terminal of the first terminal switch.

20. An operation method of a USB apparatus, comprising:
jointly providing a current path by a first terminal resistor and a first terminal switch connected to each other in series in a first terminal resistor circuit, wherein one terminal of the current path is coupled to a first configuration channel (CC) pin of a USB connector, and another terminal of the current path is coupled to a first reference voltage;
turning on the first terminal switch during a configuration detection period;
detecting, by a first overvoltage protection circuit, an overvoltage event at the first configuration channel pin;
controlling, by the first overvoltage protection circuit, the first terminal resistor circuit to turn off the first terminal switch during a power saving period after the configuration detection period ends; and
controlling, by the first overvoltage protection circuit, the first terminal resistor circuit to turn on the first terminal switch when the overvoltage event occurs at the first configuration channel pin.

21. The operation method according to claim 20, wherein the first terminal resistor circuit is an Ra resistor or an Rd resistor that conforms to USB standard specifications.

* * * * *